United States Patent Office 3,275,145
Patented Sept. 27, 1966

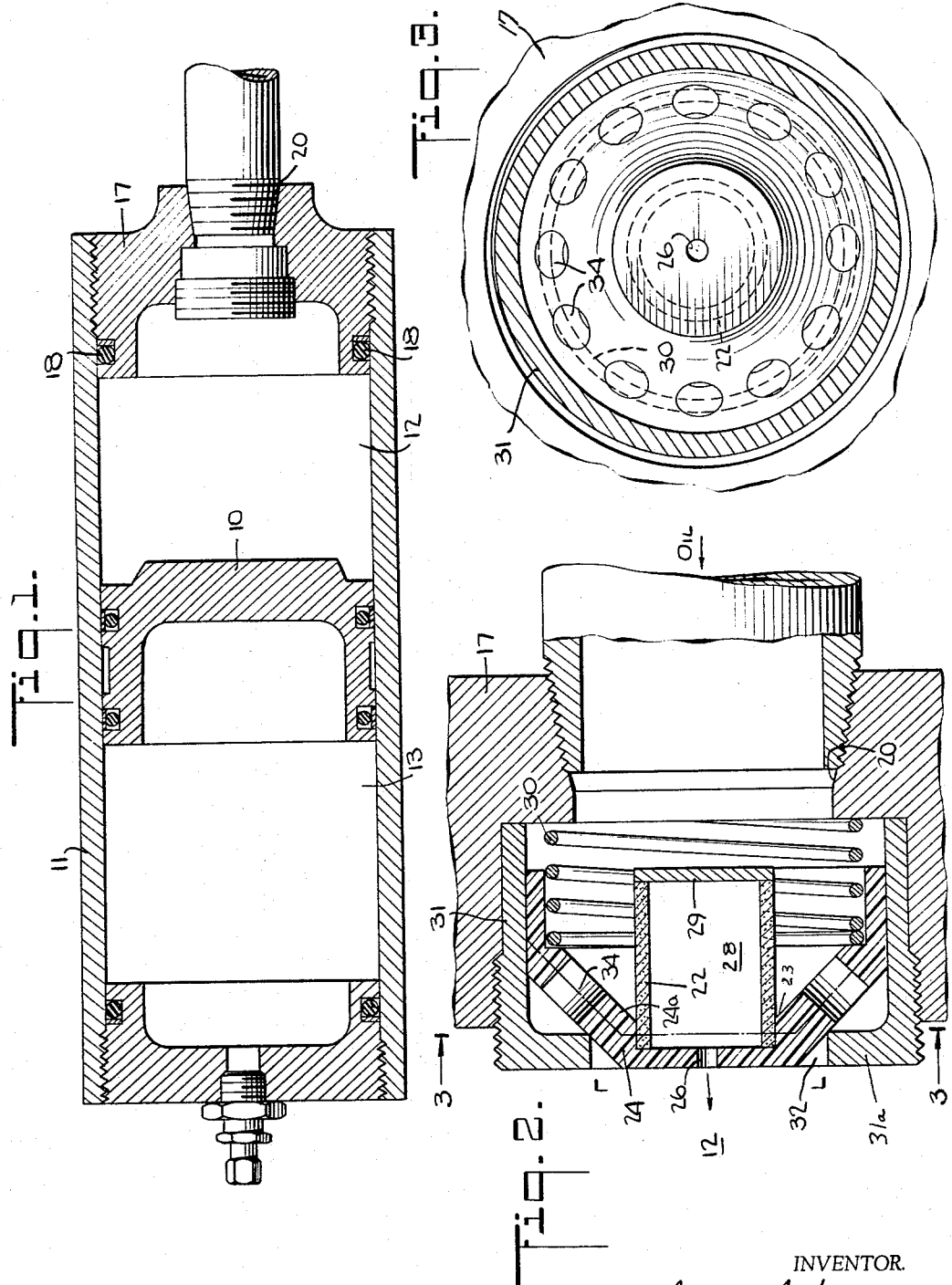

3,275,145
FILTER FOR CHECK VALVE
Alphonse A. Jacobellis, Huntington Station, N.Y., assignor to Security National Bank of Long Island, Huntington, N.Y., a national banking association
Filed Dec. 17, 1962, Ser. No. 245,210
2 Claims. (Cl. 210—136)

This invention relates to filters and more particularly to the construction of the filter and seal at the opening to the liquid chamber in an accumulator.

It is of considerable importance, particularly in piston accumulators, that the liquid in the liquid chamber be kept clean in order to avoid scoring and wear on the cylinder walls as the piston reciprocates. A major use for the hydraulic accumulator is in connection with oil lines that operate under pressure. The oil is frequently quite dirty and is a major cause of the wear between the piston and cylinder walls. Effective filtering of the oil can greatly reduce the maintenance costs and extend the life of the accumulator.

Accordingly, it is a major object of this invention to provide an accumulator filter which will effectively clean the fluid that enters the liquid chamber without restricting the fluid flow back out of the chamber.

It is another object of this invention to decrease the maintenance required on accumulators.

It is a further object of this invention to increase the life of accumulators.

It is a more particular object of this invention to incorporate a filter with the inlet seal so that the seal will required incoming liquid to pass through the filter and permit outgoing liquid to pass around the filter.

Briefly, the invention involves a sintered stainless steel filter in tubular form incorporated into normally closed check valve. When the oil is being taken into the accumulator, the valve under spring pressure closes all entrance to the liquid chamber except through the sintered metal filter. Under such conditions, the resistance offered by the filter does not materially detract from the performance of the accumulator since the line pressure is more than adequate to force fluid flow into the liquid chamber. However, when the oil is being fed back into the line, the valve opens under oil pressure to permit oil flow back into the line without going through the sintered metal filter. In this fashion the oil is filtered when it goes into the liquid chamber but not filtered on the way out. The oil in the liquid chamber is kept clean and the filter does not offer any resistance to the back flow of the oil out of the liquid chamber.

The design is also such that the back flow of the oil, out of the liquid chamber, operates to wipe particles off of the filter and thus prevent the filter from becoming unduly clogged. The life of the filter is thus extended and the down-time saved by reducing piston and cylinder wall wear is not gobbled up by down-time required to replace dirty filters.

Other objects and purposes of this invention will become apparent from a consideration of the drawings and the detailed description, in which:

FIG. 1 is a longitudinal section of a piston accumulator showing the relationship between the filter assembly and the other more standard accumulator elements;

FIG. 2 is a longitudinal section of the filter assembly, as seen in FIG. 1 except on a larger scale; and FIG. 3 is a partial section, partial elevation along 3—3 of FIG. 2, showing the arrangement of ports in the seal portion of the device of this invention.

In the drawings, the accumulator piston 10 is shown inside the main cylinder 11 thereby dividing the main cylinder into a liquid chamber 12 and a gas chamber 13. The piston 10 reciprocates inside the main cylinder 11 in response to the differential pressure between the two chambers 12, 13. It is important that the piston 10 be tightly mounted inside the cylinder 11 to avoid pressure loss around the piston, oil leakage into the gas chamber, and air leakage into the liquid chamber and thus into the oil line. It is also important that the piston 10 respond quickly to changes in pressure and thus that there be minimum friction between the cylinder 11 walls and the piston 10. Various compromises in design must be made to achieve these conflicting goals, tight fit with minimum friction.

Dirt particles operate to defeat achievement of both of these goals. When the particles are trapped between the piston 10 and cylinder 11 walls, the particles increase the friction between these two walls. More importantly, the particles score the cylinder walls and deteriorate the piston seals 15 so that oil may leak into the gas chamber 13 and air into the liquid chamber 12.

The invention of concern in this application relates to a filter and seal built into an end cap 17 at the end of the liquid chamber 12. The end cap 17 itself is stationary and screwed to the walls of the main cylinder 11 by conventional means. A seal such as an O-ring 18 serves to seal the liquid chamber 12 from the outside atmosphere. Communication between the liquid chamber 12 and the outside is through an opening 20 in the end cap 17. Normally, the opening 20 is fastened to a connection to a line carrying liquid under pressure and the liquid under pressure thus backs into the liquid chamber 12 to supply the liquid pressure at one face of the piston 10.

The details of this invention can best be seen by reference to FIGS. 2 and 3. A cylindrical sintered stainless steel filter element 22 is mounted coaxial to the opening 20 and brazed at corners 23 to a metal valve 24. The valve 24 is essentially a figure of revolution which is coaxial with the sintered metal filter element 22. An orifice 26 in the seal 24 permits communication between the liquid chamber 12 and the hollow interior 28 of the tubular filter element 22 when the valve 24 is in the open position. A solid end wall 29, together with the filter element 22 and a portion of the valve 24 define an enclosure 28 which has an opening at the orifice 26. When the valve 24 is closed, incoming liquid has to pass through the end cap opening 20, the filter element 22, into the enclosure 28 and then out through the orifice 26 into the liquid chamber 12.

The filter element 22 and valve 24 together with a spring 30 are all mounted in a housing 31. The spring 30 normally holds the valve 24 against the circular corner 31a of the housing 31 to provide a point circle contact seal. Thus the valve 24 is normally closed. The filter element 22 is brazed to the valve 24 so that the filter element 22 will reciprocate with the valve 24 as the flow of oil changes.

The valve 24 is normally closed, being spring loaded by spring 30, and prevents oil from passing into the liquid cylinder 12 except by going through the filter element 22. However, the sintered stainless steel filter element 22 requires some differential pressure across it in order to cause liquid to flow through it. Thus on the back flow of liquid out of the liquid cylinder 12, the filter element 22 would provide appreciable resistance. The resistance thereby provided is sufficient to compress the spring 30 and cause the valve 24 to move away from the opening 32 which is directly adjacent to the liquid chamber 12. When this happens, the oil in the chamber 12 can readily flow out the opening 32, through the opening 34 in the seal 24 to the main opening 20.

It is important that the filter element 22 be retracted in this manner since the back flow of oil out of the chamber 12 is at considerably less pressure than the inflow of oil. By this arrangement, the resistance to back flow is determined by the spring 30 force, which need be no more than is necessary to keep the valve 24 normally closed.

The valve 24 is designed so that the oil, on back flow from the liquid chamber 12, will be directed against the outer walls of the filter element 22 and will thus serve to clean dirt particles off the filter element 22. The valve 24 has two corner walls 24a which run at an angle of approximately 45° to the main axis of the cylinder 11 and filter element 22. Accordingly, the openings 34 in this corner wall 24a cause the flow of oil from the liquid chamber 12 to the main orifice 20 to impinge at substantially a 45° angle against the outer wall of the filter 22. The flow of oil brushing against this filter element 22 wall will dislodge dirt particles and carry the dirt particles back into the main oil line to which the accumulator is attached. In this fashion the filter element 22 is kept relatively clean and it need not be replaced for long periods of time. By this technique, the filter assembly may be used to save maintenance time on the main cylinder without adding maintenance time for filter replacement or cleaning.

A preferred embodiment of the invention has been described in some detail. Certain variations would be obvious to one skilled in the art.

For example, the particular angle of the corner walls 24a may be varied and, indeed, the openings 34 in the seal 24 need not be orthogonal to the seal wall. It is merely important that the outgoing oil flow be directed against the filter element 22 walls to keep the filter 22 clean. The embodiment shown is a preferred embodiment because of its simplicity and low cost.

The filter element 22 need not be made of sintered metal, much less sintered stainless steel. The filter element 22 could be paper backed up with metal or could be wire woven cloth. The choice depends on the application for the filter and on the type of fluid that contacts the filter element 22.

This filter is designed to solve a problem that arises in accumulator applications. However, it can be used in any application where fluid reverses its flow and it is desired to have clean fluid flow into a chamber and permit a rapid fluid flow out of the chamber.

In the specification and claims, the term "filter" or "filter assembly" is used to refer to the entire assembly and the phrase "filter element" is used to refer to the filtering piece 22 itself. The term "valve" is used to refer to the movable valve element, whether it be the element 24 or its equivalent. The valve 24 is referred to as a normally closed valve because it is closed when no fluid pressure is exerted. The terms "normal" or "normally" herein refer to the valve state when no fluid pressure is exerted on the valve.

I claim:
1. A filter assembly comprising:
(a) a housing having a front wall, a front opening in said front wall and a rear opening,
(b) a valve slidably mounted in said housing, said valve having (1) a front wall with an orifice therethrough, (2) an annular angled wall extending rearwardly and outwardly from said front wall of said valve, and (3) a side wall in sliding sealing relationship with said housing; said valve being in normal sealing relationship with said front opening of said housing, said angled wall of said valve including openings therethrough rearward of the sealing point between said valve and said front opening of said housing, said orifice in said front wall of said valve being in communication with the environment in front of said front opening of said housing when said valve is in said normal sealing relationship with said front opening of said housing,
(c) bias means for holding said valve in normal sealing relationship with said front opening of said housing, whereby (1) when said valve is in said normal sealing relationship with said front opening of said housing, said orifice is the only passage from the environment in front of said front opening of said housing through said valve; and (2) when said valve is opened, said orifice and said openings in said angled wall are the only passageways from the environment in front of said front opening of said housing through said valve, and
(d) an enclosure mounted on the rearwardly facing side of said front wall of said valve so that said orifice provides communication between the interior of said enclosure and the environment forward of said front wall of said valve, said enclosure having an annular wall portion concentric with said annular angled wall of said valve,
(e) a portion of said annular wall portion of said enclosure constituting a filter element, said filter element and said orifice constituting the sole means for fluid to flow into or out of said enclosure,
whereby the forward flow of fluid (from the rear to the front of said housing) will pass through said filter element into said enclosure and out said orifice into the environment in front of said front wall of said housing, and whereby the rearward flow of fluid will overcome said bias means to open said valve so that fluid will flow through said openings in said angled wall of said filter to impinge against the outer walls of said filter element thereby washing away whatever particles said filter element has separated from the forwardly flowing fluid.

2. A filter assembly comprising:
(a) a housing having a front wall, a front opening in said front wall and a rear opening,
(b) a valve slidably mounted in said housing, said valve having (1) a front wall with an orifice therethrough, (2) an annular angled wall extending rearwardly and outwardly from said front wall of said valve, and (3) a side wall in sliding sealing relationship with said housing; said valve being in normal sealing relationship with the rim of said front opening of said housing, said angled wall of said valve including openings therethrough rearward of the sealing point between said valve and said front opening of said housing, said orifice in said front wall of said valve being in communication with the environment in front of said front opening of said housing when said valve is in said normal sealing relationship with said front opening of said housing,
(c) bias means for holding said valve in normal sealing relationship with said front opening of said housing,
whereby when said valve is in said normal sealing relationship with said front opening of said housing, said orifice is the only passage from said front opening of said housing to said rear opening of said housing; and (2) when said valve is opened, said orifice and said openings in said angled wall are the only passageways from said front opening of said housing to said rear opening of said housing, and
(d) an enclosure mounted on the rearwardly facing side of said front wall of said valve so that said orifice provides communication between the interior of said enclosure and the environment forward of said front wall of said valve,
(e) a portion of the walls of said enclosure constituting an annular filter element concentric with said annular angled wall of said valve, said filter element and said orifice constituting the sole means for fluid to flow into or out of said enclosure,
whereby the forward flow of fluid (from the rear to the front of said housing) will pass through said filter element into said enclosure and out said orifice into the environment in front of said front wall of said housing, and whereby the rearward flow of fluid will overcome said bias means to open said valve so that fluid will flow opening of said housing; and (2) when said filter to impinge against the outer walls of said filter element thereby washing away whatever particles said filter element has separated from the forwardly flowing fluid.

References Cited by the Examiner

UNITED STATES PATENTS

| | | | |
|---|---|---|---|
| 574,644 | 1/1897 | Vance | 210—390 |
| 2,375,646 | 5/1945 | Grossi | 138—41 |
| 2,532,568 | 12/1950 | Myers | 137—547 |
| 2,853,159 | 9/1958 | Kuhn | 137—513.3 X |
| 3,001,799 | 9/1961 | Plume | 137—513.3 X |

FOREIGN PATENTS

| | | |
|---|---|---|
| 644,742 | 7/1962 | Canada. |
| 785,809 | 5/1935 | France. |
| 538,802 | 11/1931 | Germany. |
| 580,816 | 9/1946 | Great Britain. |

REUBEN FRIEDMAN, *Primary Examiner.*

F. W. MEDLEY, R. A. CATALPA, *Examiners.*